UNITED STATES PATENT OFFICE.

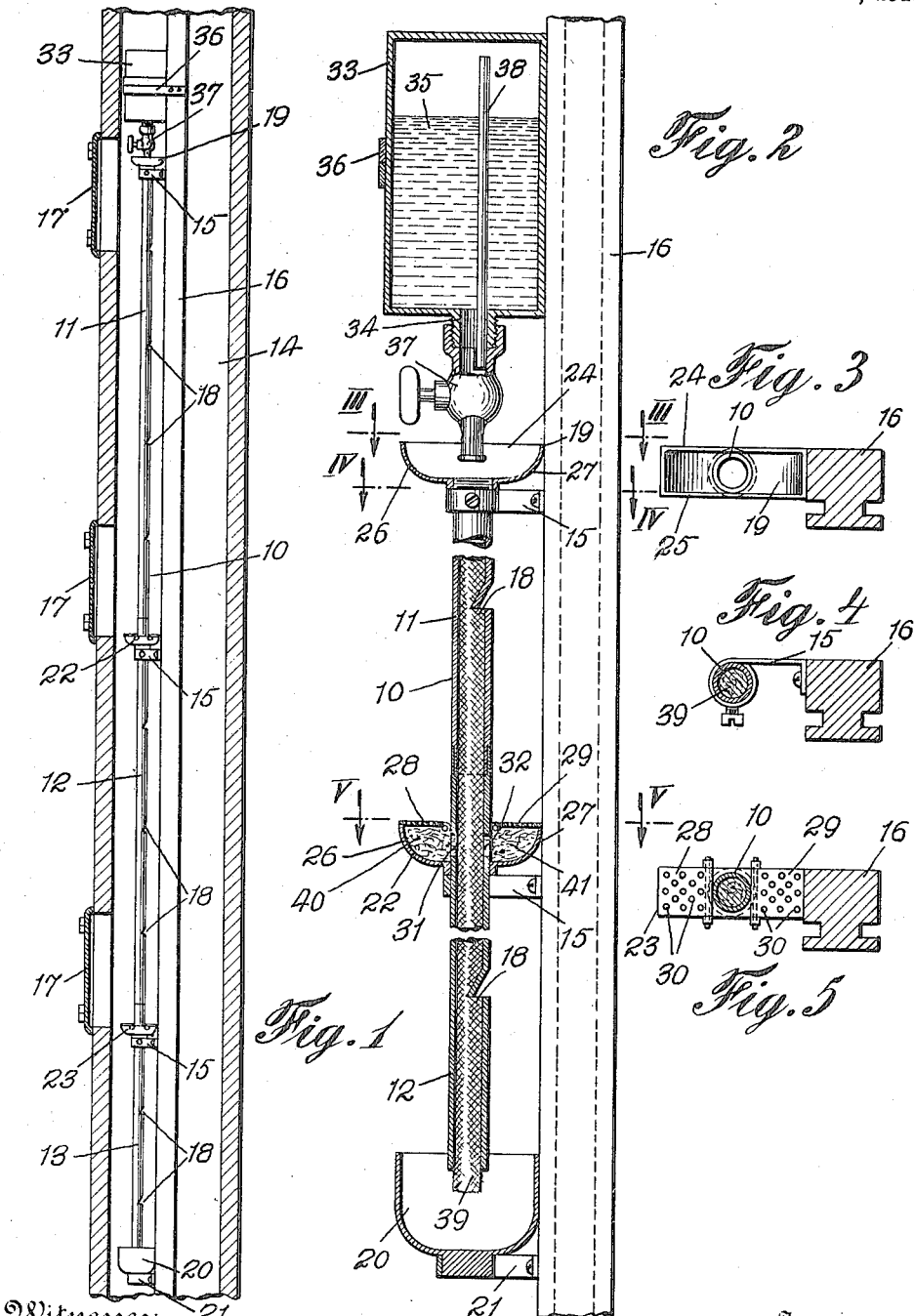

LOLA APPLETON, OF NEW YORK, N. Y.

FUMIGATING DEVICE.

1,164,624. Specification of Letters Patent. Patented Dec. 21, 1915.

Application filed October 8, 1914. Serial No. 865,669.

*To all whom it may concern:*

Be it known that I, LOLA APPLETON, a citizen of the United States, and a resident of New York, county and State of New York, have invented a certain new and useful Improvement in Fumigating Devices, of which the following is a full, clear, and exact specification.

This invention relates to a class of devices adapted to be used for disinfecting purposes.

My invention has for its object primarily to provide a fumigating device designed to be employed especially in the dumb-waiter shafts of buildings and like places for disinfecting the atmosphere thereof when contaminated by impurities from garbage and other refuse, and wherein is provided an absorbent feeder or wick leading from a supply reservoir containing a volatile liquid disinfecting material which is delivered to the feeder in suitable proportions, the vapor or fumes therefrom being distributed to permeate the surrounding air through the medium of one or more absorbent distributers on the feeder, thus preventing the spreading of offensive odors as well as maintaining proper sanitary conditions.

Other objects of the invention are to provide a tubular container or pipe in which the absorbent feeder is mounted; to provide on the tubular container one or a number of perforated casings, or cups; and to provide a number of spaced orifices in the container through which the vapor or fumes of the disinfectant are also distributed.

With these and other objects in view, the invention will be hereinafter more particularly described with reference to the accompanying drawing forming a part of this specification in which similar characters of reference indicate corresponding parts in all the views, and will then be pointed out in the claims at the end of the description.

In the drawing, Figure 1 is an elevation of one form of fumigating device embodying my invention showing the manner of its use in conjunction with a dumb-waiter shaft. Fig. 2 is an enlarged sectional view, partly broken away and partly in detail, of the device. Fig. 3 is a view, partly in section and partly in detail, taken on the line III—III of Fig. 2. Fig. 4 is a section taken on the line IV—IV of Fig. 2, and Fig. 5 is a section taken on the line V—V of Fig. 2.

The fumigating device has a tubular container, or pipe 10 composed of sections, as 11, 12, 13, which may be of a suitable number whereby the length of the pipe may be shortened or lengthened in accordance with the height of the dumb-waiter shaft, as 14, or other place, and the opposed ends of the sections are formed so as to snugly interfit with each other. The pipe 10 is disposed vertically in the shaft and may be held stationary therein by any suitable means, for instance by a number of spaced straps, as 15, secured to one of the usual guides 16 in the shaft. Each of the sections of the pipe 10 is of a length approximately equivalent to the height of each story of the building in which the device is used so that the upper end of each section will terminate at an entrance, as 17, to the shaft, and through the pipe of each section are a number of spaced orifices 18.

On the top end of the upper section 11 of the pipe 10 is a receiving cup 19 of any suitable shape having an opening in its bottom which communicates with the passage through the pipe, and the lower end of the bottom section of the pipe leads into a drip cup 20 which is also secured by a strap 21 to the guide 16. In proximity to the upper ends of the sections 12 and 13 of the pipe are provided casings, or cups 22 and 23 which are similar in formation. While the cups may be of any desired shape, each cup is preferably formed with vertically disposed side walls 24, 25, and end walls 26, 27 which curve downwardly toward the pipe in a parabolic shape so that the end portions of each cup will extend in opposite lateral directions from the pipe. On the top of the end portions of each of the cups 22 and 23 are two covers 28 and 29, each having a number of perforations 30 therethrough, and the opposed ends of the covers of each cup are hinged thereto so as to be swung upwardly toward the pipe. Through diametrically opposite parts of each section 12 and 13 of the pipe are openings 31 and 32 providing communications between the interior of the section and the cup thereof.

For the purpose of providing a suitable source of supply of disinfecting material for delivery to the receiving cup 19 and to the pipe 10, a reservoir, or tank, as 33, is provided. The supply tank 33 may be of the form of a well-known substantially square or rectangular metal can having at its inlet through one end thereof the usual projecting exteriorly threaded boss, as 34, which is ordinarily closed by a threaded cap, not shown. This type of tank is preferably employed, in order to permit the supply of the disinfecting material to be conveniently replenished at intervals by enabling a number of the tanks to be filled with the disinfectant, as 35, at one place and then delivered for use to the various devices. The disinfecting material may be of any suitable formula in liquid form having volatile properties whereby the vapor or fumes therefrom will permeate the surrounding atmosphere when distributed, and to allow the disinfectant to be properly delivered to the receiving cups 19 and to the pipe 10 the supply tank is detachably held to the dumb-waiter guide 16 by means of a strap 36 or otherwise which is arranged so that the tank will be in an inverted position for its outlet to be disposed over the receiving cup of the pipe 10. On the threaded boss 34 of the tank is removably applied a valve, as 37, of any ordinary type adapted to be adjusted whereby the flow of the liquid disinfectant from the tank may be suitably regulated, and to establish a uniform flow of the liquid on the interior of the valve is soldered or otherwise secured one end of a vent tube 38 which passes through the boss of the tank and extends upwardly thereinto toward its other end for air to be admitted into the tank through the valve during the passage of the liquid.

Serving to allow the liquid disinfectant to be delivered and distributed through all the sections of the pipe 10, in the pipe is disposed a feeder, or wick 39 made of woven thread or other absorbent material, and this wick is of a length to extend from the receiving cup 19 through the pipe into the cup 20 so that the dripping from the wick will be received therein. In the cups 22 and 23 are distributers, as 40 and 41, each of which may be in the form of an absorbent wick or a batch of cotton of sufficient quantity to fill both ends of each cup, and parts of each of these distributers are disposed through the openings 31 and 32 of the pipe which communicate with the interior of the cup thereof so as to contact with the absorbent feeder, or wick 39. When the disinfecting liquid is delivered from the supply tank through the valve 37 to the wick 39 the liquid will be absorbed thereby, and through capillary attraction part of the liquid will be conveyed to the distributers 40 and 41. The vapor or fumes of the disinfectant will then pass through the perforated covers of the cups and through the orifices 18 of the sections of the pipe for permeating the surrounding atmosphere whereby the spreading of offensive odors will be prevented as well as maintaining proper sanitary conditions.

In the foregoing description, I have embodied the preferred form of my invention, but I do not wish to be understood as limiting myself thereto as I am aware that modifications may be made therein without departing from the principle, or sacrificing any of the advantages of this invention, therefore I reserve to myself the right to make such changes as fairly fall within the scope of the appended claims.

Having thus described my invention, I claim as new and desire to secure by Letters Patent:—

1. In a fumigating device of the character described, an absorbent feeder leading from a source of supply of volatile liquid disinfecting material, and a plurality of absorbent distributers at spaced intervals on the feeder, said distributers comprising cups adapted to contain absorbent material, and perforated covers for said cups adapted to be opened for obtaining access thereto, said distributers being provided for receiving by capillary attraction the disinfecting material from the feeder whereby the vapor or fumes of the disinfectant will be distributed in the surrounding atmosphere, substantially as set forth.

2. A fumigating device adapted to be employed in a shaft, comprising a tank containing a volatile liquid disinfecting material, a pipe leading from the outlet of the tank, an absorbent wick within the pipe, means on the tank for regulating the discharge of the disinfecting liquid to the wick, and means at spaced intervals on the pipe to permit the vapor or fumes of the disinfecting material absorbed by the wick to be distributed in the surrounding atmosphere while preventing leakage of the liquid as such, substantially as set forth.

3. A fumigating device adapted to be employed in a shaft, comprising a tank containing a volatile liquid disinfecting material, a pipe leading from the outlet of the tank, and composed of interfitting apertured sections, an absorbent wick within the pipe, means on the tank for regulating the discharge of the disinfecting liquid to the wick, cups on the pipe, perforated covers hinged to the cups to open toward the pipe, and an absorbent wick in each cup, contacting with the wick of the pipe to permit the vapor or fumes of the disinfecting material to be distributed in the surrounding atmosphere, substantially as set forth.

4. A fumigating device adapted to be employed in a shaft, comprising a separate tank containing a volatile liquid disinfecting material, a pipe leading from the outlet of the tank, an absorbent wick within the pipe, means on the tank for regulating the discharge of the disinfecting liquid to the wick, a plurality of perforated cups at spaced intervals, absorbent material in each cup, contacting with the wick whereby the disinfectant of the wick will be absorbed so that the vapor or fumes of the disinfectant will be distributed through the perforated cups into the surrounding atmosphere, substantially as set forth.

5. In a fumigating device of the character stated, a tank adapted to contain liquid disinfectant, a valved outlet therefor, means for causing the uniform discharge of the liquid, a pipe vertically disposed and depending from the outlet in close proximity thereto, said pipe having a plurality of orifices at spaced intervals, cups mounted on the pipe at certain of said intervals to have the adjacent orifices communicating therewith, a drip cup into which the lower end of the pipe projects, a receiving cup on the upper end of the pipe, an absorbent feed wick extending entirely through the pipe and absorbent material in the first mentioned cups to be supplied by capillary attraction with the disinfectant for permeating the air therewith, said wick serving to take up superfluous disinfectant from the drip cup.

This specification signed and witnessed this seventh day of October A. D. 1914.

LOLA APPLETON.

Witnesses:
D. W. HOLLISTER,
M. DERMODY.

Copies of this patent may be obtained for five cents each, by addressing the "Commissioner of Patents, Washington, D. C."